Oct. 16, 1951  C. E. GARDNER  2,571,355
METHOD AND APPARATUS FOR SIMULTANEOUS
TWO-WAY STRETCHING OF FILM
Filed July 7, 1948  2 Sheets-Sheet 1

INVENTOR.
CHARLES E. GARDNER
BY
R H Waters
ATTORNEY

Oct. 16, 1951     C. E. GARDNER     2,571,355
METHOD AND APPARATUS FOR SIMULTANEOUS
TWO-WAY STRETCHING OF FILM

Filed July 7, 1948     2 Sheets-Sheet 2

*INVENTOR.*
CHARLES E. GARDNER
BY R H Waters
ATTORNEY

Patented Oct. 16, 1951

2,571,355

UNITED STATES PATENT OFFICE 2,571,355

METHOD AND APPARATUS FOR SIMULTANEOUS TWO-WAY STRETCHING OF FILM

Charles E. Gardner, Hollis, N. Y., assignor to Wingfoot Corporation, Akron, Ohio, a corporation of Delaware Application July 7, 1948, Serial No. 37,453

6 Claims. (Cl. 18—19)

This invention relates to the simultaneous stretching in substantially perpendicular directions of films of thermostretchable plastics. It includes the process of stretching and apparatus therefor. Certain advantages result from the use of the process and apparatus in stretching films in which stretching is accompanied by only a relatively small amount of plastic flow, such as films of rubber hydrochloride; copolymers of vinyl chloride and another monomer such as vinyl acetate, vinylidine chloride, ethyl and higher esters of unsaturated acids such as maleic, fumaric, etc.; polyethylene and modified polyethylenes, etc. Such films, after stretching, tend to shrink, the amount of shrinking which takes place being generally due, in part, to the temperature of the film when the stretching tension is released.

The art describes the stretching of films, first in one direction and then in the direction perpendicular to the first, but not simultaneous stretching in these two directions—sometimes briefly called two-way stretching. The product obtained by simultaneous two-way stretching is different from that obtained by stretching in perpendicular directions as separate operations because, when the film is stretched first in one direction and then in the other, the second stretching may entirely obliterate the tendency to shrink in the direction of the first stretching.

One-way stretching aligns many of the crystals or molecular aggregates of a plastic having low plastic flow, so that they point in the direction of the stretch. This increases the tensile in the direction of stretch and decreases the resistance to tear in this direction. If film is stretched first in one direction and then in the other, the molecular alignment produced by the first stretching operation will be either partially or entirely upset by the alignment resulting from the second stretching operation. However, if the stretching in perpendicular directions is carried on simultaneously, there is less pronounced alignment of the molecules or molecular aggregates because the area of the film is increased in all directions.

The plastic in the stretched film is in a state of unstable equilibrium. If heated, it shrinks. If the film be stretched in only one direction, it shrinks in this direction only. If stretched first in one direction and then in another, it probably will shrink only in the direction of the second stretching, but this depends upon the amount the film has been stretched in the two directions. If stretched in both directions simultaneously, the film will shrink in all directions when heated.

In order to stretch simultaneously in both directions, the film is heated and gripped along each edge at spaced intervals. Then the gripping means at the opposite edges are moved laterally away from one another, and simultaneously the gripping means at the respective edges of the film are separated longitudinally.

In stretching most films, it is necessary that they be hot while being stretched, but with rubber hydrochloride film (and rubber hydrochloride film appears to be unique in this respect), the film after heating may be allowed to cool to room temperature before stretching, provided the film is stretched within a relatively short time after heating.

Stretching and shrinking are dependent upon the same inherent property of the rubber hydrochloride. Thus, after heating, so long as the rubber hydrochloride film remains stretchable, it will shrink. Therefore, after stretching, it must be kept under tension until it sets. If it is rolled up on completion of the stretching, it must be re-rolled several times during the next few hours or its shrinking will cause such pressure on the overlapping layers of the film that they will become welded into a solid mass.

In a preferred type of equipment for simultaneous stretching in substantially perpendicular directions, a drum is provided and conical surfaces spread outwardly from opposite ends of the drum. Film-gripping means are located at opposite sides of the drum, and these are adapted to fan outwardly as they spiral over the conical surfaces. Thus, as the gripping means at opposite edges are moved apart, the film is stretched laterally; and as the gripping means at the respective film edges spiral out from a portion of the cone of smaller circumference to one of larger circumference, the film is simultaneously stretched longitudinally.

The invention will be further described in connection with the accompanying drawings, in which.

Figure 2:
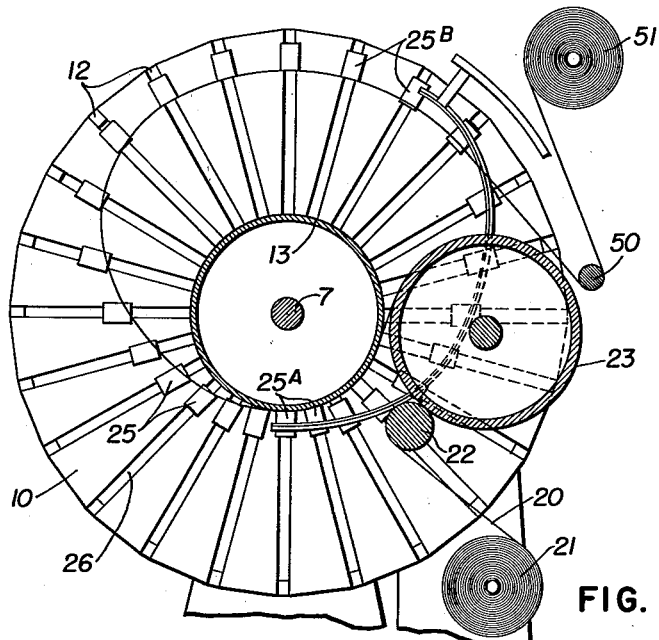
Fig. 2 is a section on the line 2—2 of Fig. 1.
Figure 1:
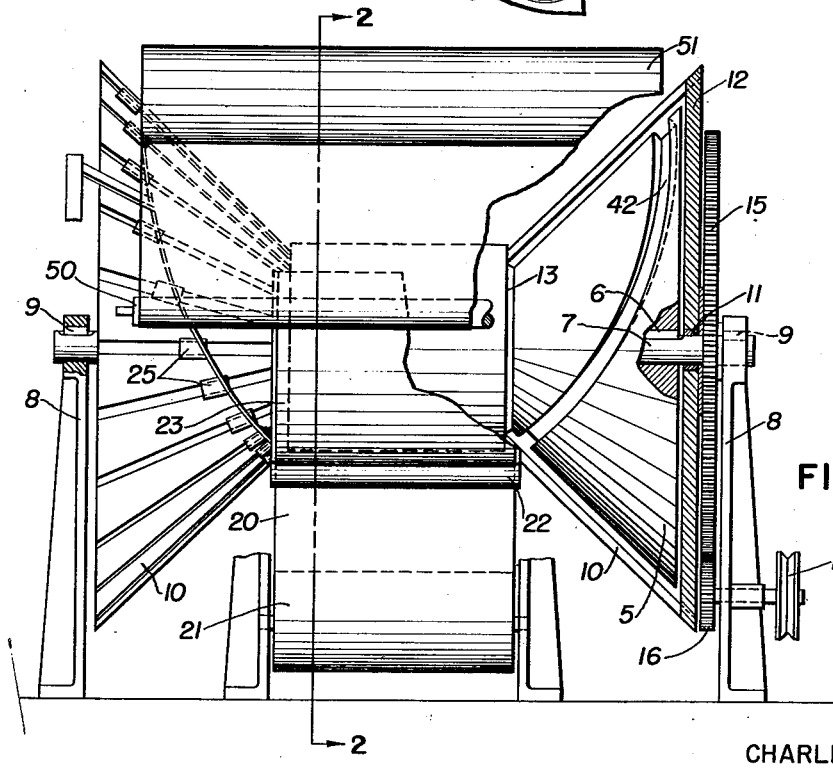
Fig. 1 is an elevation, partly broken away, of the front of the stretching equipment, showing film in the process of being stretched.

The machine is generally symmetrical. It is formed of the truncated cones 5 which are keyed by the key 6 to the shaft 7. This shaft is supported in the standards 8, and the key 9 prevents it from turning. The outer drums 10 fit over these cones and are rotatably mounted on the shaft with bearings 11 provided to facilitate rotation. These drums are made of tapering slats supported at their wider ends by the ring 12 and at their narrower ends by the cylindrical drum 13. The gear 15 is fastened to the right-hand face of one of the outer drums 10 so as to rotate both drums from the small gear 16 and driving means connected with the drive pulley 17.

The unstretched film 20, which may be rubber hydrochloride film, is unrolled from the stock roll 21. It passes over the idler roll 22 and then around the electrically heated roll 23. The heated film is grasped at its opposite edges by the clips 25. These clips are mounted in the slots 26 between the tapered slats of the outer drum 10.

Figure 4:
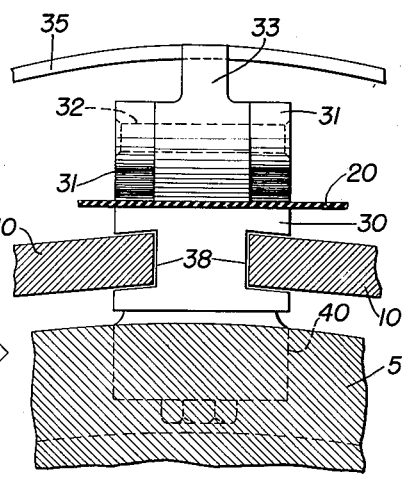
Fig. 4 is a detail on the line 4—4 of Fig. 3.
Figure 3:
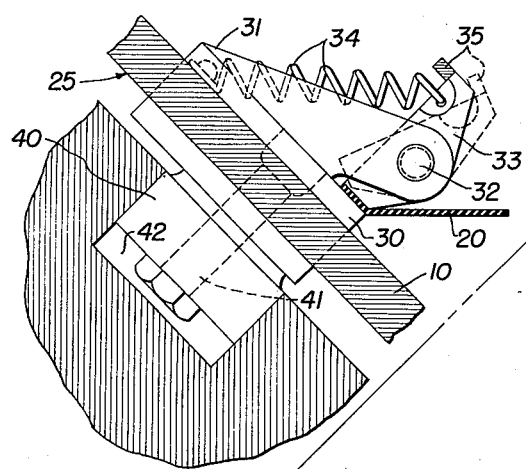
Fig. 3 is a detail showing one of the clips for holding the film.

Figs. 3 and 4 show details of the clips. Mounted on opposite sides of the upper surface of the body portion 30 of each clip are the ears 31. Pivoted between the ears on the shaft 32 is the clip member 33. The spring 34 normally holds the clip member 33 in the position illustrated in full lines in Fig. 3; that is, with its bottom face seated against the upper surface of the member 30. The guide rail 35 bears against the upper end of the clip member 33 to open the clip for grasping and releasing the film. The openings 38 in opposite sides of the body portion 30 fit snugly over the edges of the slats of the outer drum 10, and these openings 38 are lubricated so that the clips slide back and forth in the slots 26. The roller 40 is rotatably mounted on the shaft 41 which passes through the body portion 30 of the clip, and this roller fits into the cam track 42 in one of the cones 5.

The film is stretched in the following manner: The unheated film is taken from the stock roll 21 and is heated as it passes over the heated roll 23. As it leaves the heated roll 23, its opposite edges are grasped by the clips 25a located adjacent the drum 13 where the circumference of the cone is small. The guide rail 35 has the clips in an opened position as they reach this position. Here the guide rail terminates, or is bent away from the clips so that as the clips come to this point they close onto the film 20 as shown in Fig. 3.

As the outer drum 10 revolves, the rollers 40 follow the cam tracks 42 and move the clips on both sides of the drum from the central portion of the drum which is of smaller circumference to the outer edge which is of larger circumference. In this way the width of the film is increased. Simultaneously, as the clips move from the central portion of the drum toward the outer edge, they fan out, becoming spaced farther and farther from one another. The spreading of the clips—whether they separate at a uniform rate or spread more rapidly during the early part of the stretch or the latter part of the stretch—is controlled by the surface of the outer drum. If this surface is dished, the clips will spread less rapidly at the start of the stretching operation than if the surface is flat as illustrated in the drawings. As the clips are spread laterally and longitudinally, simultaneously, the film is stretched simultaneously in both directions. By varying the path of the cam track and by varying the nature of the surface of the outer drum, the timing and the amount of the stretch in both directions may be varied. The film may be stretched the same amount laterally and longitudinally; i. e., 100 per cent or more or less up to several hundred per cent. On the other hand, it may be stretched a greater amount laterally or longitudinally, as desired. For packaging operations where the film is to be heated to shrink it to the article to be packaged, substantially uniform stretching in both directions will be desired so that on subsequent heating the film will shrink substantially uniformly in all directions.

On completion of the stretching operation, the film is held in the clips which are located at the outer edges of the two drums 10. These clips are in the position indicated by the clips 25b at the top of the drum. Here each guide rail bears against the top of the clip element 33 as the clips pass by it and opens them, releasing the film. The stretched film, released from the clips, passes over the idler 50 and is wound onto the wind-up roll 51.

The film cools off during the stretching operation unless the whole equipment is enclosed in a heating chamber. For the stretching of rubber hydrochloride film, no such heating chamber is required because the film retains its ability to stretch for a considerable period even though it may be cooled to room temperature or lower. Films such as rubber hydrochloride film and other films of low plastic flow shrink to an appreciable degree within a few hours of the completion of the stretch, and it is, therefore, necessary to rewind the stretched film several times during the first few hours after the completion of the stretch to allow the film to contract somewhat. Unless the film is rewound, it will shrink tight on the wind-up roll 51 and will bind so tightly that the overlapping films will become welded together as one solid mass.

Figure 5:
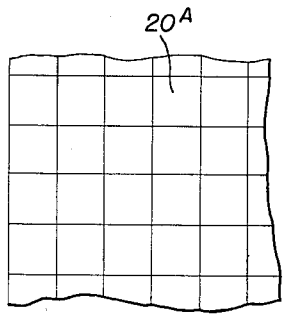
Figs. 5 and 6 illustrate how the film is stretched.
Figure 6:
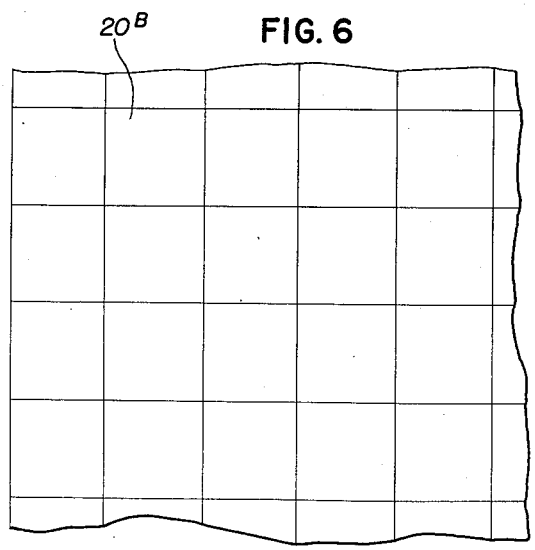

Figs. 5 and 6 illustrate the stretching of the film. For the purpose of illustration it is presumed that the film on the stock roll 21 is ruled with lines equally spaced in both directions. This is the unstretched film 20a shown in Fig. 5. The film, after stretching, is the film 20b shown in Fig. 6. Here both the horizontal and vertical lines are spaced a greater distance than in the film 20a of Fig. 5. Thus, the film has been stretched in both directions. The degree of stretching in one direction may be greater than in the other direction. However, the film has been stretched simultaneously in the two directions and on any subsequent contraction due to heating or the like the film will shrink in all directions.

It has been found that in stretching rubber hydrochloride film, up to a certain elongation (known as the A point of the stress and strain curve) an increase in load is required to stretch the film. After such elongation has been attained considerable further elongation can be produced (up to the B point of the stress and strain curve) without any substantial increase in the load. Beyond this, any increase in elongation requires an increase in the load. Until all the film has been stretched to the B point, area-stretching such as is here contemplated (as distinguished from the usual longitudinal stretching which is line-stretching) produces non-uniform stretching. To produce uniform stretching the lateral and longitudinal stretching should both be beyond the B point. Stretching two hundred per cent in both directions is ample. Rubber hydrochloride film can be stretched much beyond this.

When rubber hydrochloride film is stretched in only one direction the molecular aggregates become aligned in this direction. This increases the tensile strength in this direction and reduces it in the other direction. It reduces the tear strength in this direction but increases it in the opposite direction. On subsequent heating the film shrinks in the direction in which it has been stretched. Subsequent stretching in the opposite direction tends to erase the effect of the first stretching, and if the subsequent stretching is sufficient no noticeable effect of the first stretching remains. On subsequent heating the film will shrink only in the direction in which it was last stretched. However, by simultaneously stretching in perpendicular directions, the molecular aggregates become aligned in the plane of the film without noticeable alignment in either of the directions in which the film has been stretched. This strengthens the film, and on subsequent heating the film shrinks in all directions. If stretched in about the same amount in both directions, the film will shrink substantially uniformly in all directions.

Although the stretching of rubber hydrochloride film has been described more particularly, the equipment is suited to the stretching of films of other plastics.

What I claim is:

1. The process of stretching thermostretchable film material which comprises heating the film and gripping it in closely spaced positions along its edges and then stretching it simultaneously in two directions substantially perpendicular to one another by separating the gripping means longitudinally and laterally, simultaneously.

2. The method of stretching rubber hydrochloride film which comprises heating the film and gripping it in closely spaced positions along its edges and then stretching it simultaneously in two directions substantially perpendicular to one another by separating the gripped portions of the film longitudinally and laterally, simultaneously.

3. Apparatus for stretching film simultaneously in substantially perpendicular directions which comprises film-heating means, means for gripping the film at intervals along the edges thereof, and means for separating the several gripping means at the respective edges of the film and simultaneously separating laterally the gripping means on opposite edges of the film.

4. Means for stretching film simultaneously in two directions which comprises film-heating means, a plurality of means for progressively gripping the film at substantially uniform intervals at opposite edges of the film, and means for progressively moving each of the individual gripping means laterally to stretch the film laterally and for simultaneously successively moving each individual gripping means longitudinally of the film fast enough to stretch the film longitudinally.

5. Means for stretching film formed of two cone-shaped members disposed symmetrically opposite to one another with their bases outward, slots radiating outwardly in the surface of each member, and underneath these members cam cones with a continuous cam track in each which makes one circuit of the cam cones and leads from near the base of the cone to a portion of considerably smaller diameter and back again, film clips adapted to slide in said slots with guide members fastened to the clips and located in the cam tracks, and means for opening the clips when the clips are in the portion of the cam track toward the base of the cone to release the film clipped therein and for closing the clips when located toward the position of smaller diameter to grasp film fed thereto.

6. Apparatus for stretching film simultaneously in substantially perpendicular directions which comprises film-heating means, closely spaced individual gripping means adapted to grip opposite edges of the film and means for simultaneously moving the individual gripping means on each side of the film laterally outwardly and longitudinally for stretching the film simultaneously in substantially perpendicular directions.

CHARLES E. GARDNER.

REFERENCES CITED

The following references are of record in the file of this patent:

UNITED STATES PATENTS

| Number | Name | Date |
|---|---|---|
| 2,047,497 | Studt | July 14, 1936 |
| 2,255,940 | Rogers | Sept. 16, 1941 |
| 2,289,668 | Mallory | July 14, 1942 |
| 2,297,645 | Bailey | Sept. 29, 1942 |
| 2,301,222 | Minich | Nov. 10, 1942 |
| 2,309,370 | Williams | Jan. 26, 1943 |
| 2,328,827 | Martin | Sept. 7, 1943 |
| 2,331,762 | Brown | Oct. 12, 1943 |
| 2,425,581 | Vincent | Aug. 12, 1947 |
| 2,486,760 | Pfeiffer | Nov. 1, 1949 |
| 2,490,781 | Cloud | Dec. 13, 1949 |
| 2,505,146 | Ryan | Apr. 25, 1950 |